US012118354B2

(12) United States Patent
Taassori et al.

(10) Patent No.: US 12,118,354 B2
(45) Date of Patent: Oct. 15, 2024

(54) VIRTUALLY PADDING DATA STRUCTURES

(71) Applicant: Advanced Micro Devices, Inc., Santa Clara, CA (US)

(72) Inventors: Meysam Taassori, Santa Clara, CA (US); Shaizeen Dilawarhusen Aga, Sunnyvale, CA (US); Mohamed Assem Abd ElMohsen Ibrahim, Santa Clara, CA (US); Johnathan Robert Alsop, Seattle, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 107 days.

(21) Appl. No.: 17/899,231

(22) Filed: Aug. 30, 2022

(65) Prior Publication Data
US 2024/0069915 A1 Feb. 29, 2024

(51) Int. Cl.
*G06F 9/30* (2018.01)
*G06F 12/10* (2016.01)
*G06F 16/22* (2019.01)

(52) U.S. Cl.
CPC .......... *G06F 9/30036* (2013.01); *G06F 12/10* (2013.01); *G06F 16/2237* (2019.01)

(58) Field of Classification Search
CPC .. G06F 16/2237; G06F 17/16; G06F 12/0246; G06F 12/10; G06F 9/30036
USPC ...... 711/3, 114, 103, E12.001, E12.008, 154
See application file for complete search history.

(56) References Cited

U.S. PATENT DOCUMENTS

| 6,075,545 A * | 6/2000 | De Bonet ................. G06T 1/60 |
| | | 345/565 |
| 10,037,490 B2 | 7/2018 | Young et al. |
| 2011/0202695 A1* | 8/2011 | Nandan ................ H04N 19/563 |
| | | 711/E12.019 |
| 2018/0246669 A1 | 8/2018 | Redfern et al. |
| | (Continued) | |

FOREIGN PATENT DOCUMENTS

EP 3761235 A1 1/2021

OTHER PUBLICATIONS

Kuzmanov, Georgi, et al., "Hardwired MPEG-4 Repetitive Padding", IEEE Transactions on Multimedia, vol. 7, No. 2 [retrieved Jan. 2, 2023]. Retrieved from the Internet <https://ieeexplore.ieee.org/abstract/document/1407899>., Apr. 2005, 8 Pages.
(Continued)

*Primary Examiner* — Yaima Rigol
*Assistant Examiner* — Edward Waddy, Jr.
(74) *Attorney, Agent, or Firm* — FIG. 1 Patents (57) ABSTRACT

A virtual padding unit provides a virtual padded data structure (e.g., virtually padded matrix) that provides output values for a padded data structure without storing all of the padding elements in memory. When the virtual padding unit receives a virtual memory address of a location in the virtual padded data structure, the virtual padding unit checks whether the location is a non-padded location in the virtual padded data structure or a padded location in the virtual padded data structure. If the location is a padded location in the virtual padded data structure, the virtual padding unit outputs a padding value rather than a value stored in the virtual padded data structure. If the location is a non-padded location in the virtual padded data structure, a value stored at the location is output.

20 Claims, 7 Drawing Sheets

(56) References Cited

U.S. PATENT DOCUMENTS

2019/0057140 A1* 2/2019 Pitchumani ........... G06F 3/0614
2021/0326406 A1* 10/2021 Wang ....................... G06N 3/08

OTHER PUBLICATIONS

Lyu, Yecheng, et al., "ChipNet: Real-Time LiDAR Processing for Drivable Region Segmentation on an FPGA", IEEE Transactions on Circuits and Systems I: Regular Papers, vol. 66, No. 5, [retrieved Jan. 2, 2023]. Retrieved from the Internet <https://ieeexplore.ieee.org/abstract/document/8580596>., Nov. 11, 2018, 12 Pages.

* cited by examiner

VIRTUALLY PADDING DATA STRUCTURES

BACKGROUND

Computers are used for many different applications that involve various types of arithmetic operations, such as matrix multiplication. One way to improve the performance of such operations is to change the size or shape of a matrix before performing the operation. The shape or size of a matrix is oftentimes changed by adding padding elements to different dimensions of the matrix.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Computers perform various mathematical operations on matrices and other data structures, such as matrix multiplication. Depending on the computer hardware that performs these operations, the size or shape of a matrix is changeable by adding padding elements to different dimensions of the matrix. However, one problem experienced with adding padding elements to a matrix is that typically the entire matrix is read from memory and written back to memory as a padded matrix. This process takes time and requires extra memory capacity to store the padding elements.

The techniques discussed herein provide a virtual padded data structure, such as a virtual padded matrix. To provide a virtual padded data structure, a component of a computing device (e.g., a virtual padding unit implemented in hardware) provides output values for a padded data structure without storing all of the padding elements in memory. In response to a request to generate a padded data structure from an initial non-padded data structure, the virtual padding unit maintains a record of the memory address range of the initial non-padded data structure as well as a record of the memory address range of the virtual padded data structure. The virtual padding unit receives a memory address of a location in the virtual padded structure, the memory address being a virtual memory address in one or more implementations. When the virtual padding unit receives a memory address of a location in the virtual padded data structure, the virtual padding unit checks whether the location is a non-padded location in the virtual padded data structure or a padding element in the virtual padded data structure. If the location is a padding element in the virtual padded data structure, the virtual padding unit outputs a padding value rather than a value stored at the location. However, if the location is a non-padded location in the virtual padded data structure, the virtual padding unit outputs an address to be translated and used to fetch a value stored at the location, or outputs the value stored at the location.

The techniques discussed herein provides output values for a padded data structure without incurring the time taken to generate the padded data structure from the initial non-padded data structure and store the padded data structure in memory. By providing a virtual padded data structure without generating and storing a padded data structure in memory, the techniques discussed herein avoid any performance cost of invoking a padding function that generates and stores a padded data structure in memory, as well as reduce the amount of memory used (e.g., when generating a padded data structure memory need not be allocated for both the padded and non-padded data structures).

Furthermore, in some situations the data structures are very large and storing both the padded data structure and the initial non-padded data structure in memory at the same time exceeds the memory capacity of the computer and reduce performance of the computer. By providing a virtual padded data structure without generating and storing a padded data structure in memory, the techniques discussed herein avoid any such memory capacity issues.

Additionally, generating the padded data structure and storing both the padded data structure and the initial non-padded data structure in memory increases memory traffic and adds numerous entries to the cache hierarchy, which typically results in the eviction of other data blocks from the cache memory. This increases the cache miss rate when those other data blocks are read from memory. By providing a virtual padded data structure without generating and storing a padded data structure in memory, the techniques discussed herein avoid such increases in memory traffic and any such eviction and cache miss issues.

In some aspects, the techniques described herein relate to a method including: receiving an address of a location in memory, and outputting, based on the address corresponding to a padding value in the virtually padded data structure and without having stored all of multiple padding elements of the virtually padded data structure in memory, the padding value.

In some aspects, the techniques described herein relate to a method, wherein the virtually padded data structure includes a virtually padded matrix.

In some aspects, the techniques described herein relate to a method, further including outputting, based on the address corresponding to a value in the virtually padded data structure that is not a padding value, an address of the location in an initial data structure that is a basis for the virtually padded data structure.

In some aspects, the techniques described herein relate to a method, further including, based on the address not corresponding to a location in the virtually padded data structure, passing through the address.

In some aspects, the techniques described herein relate to a method, further including: maintaining a record of a location, a shape, and a size of the virtually padded data structure, and a location, a shape, and a size of an initial data structure that is a basis for the virtually padded data structure.

In some aspects, the techniques described herein relate to a method, further including: receiving a padding instruction identifying the initial data structure and a type of padding to use for the virtually padded data structure, and maintaining, in the record, an indication of the type of padding as associated with the initial data structure.

In some aspects, the techniques described herein relate to a method, wherein the outputting includes outputting, as the padding value, a constant value.

In some aspects, the techniques described herein relate to a method, further including: receiving a padding instruction identifying an initial data structure that is a basis for the virtually padded data structure and a type of padding to use for the virtually padded data structure.

In some aspects, the techniques described herein relate to a method, further including: retrieving from a cache, based on the address corresponding to a padding value in the virtually padded data structure, the padding value, and retrieving from the cache, based on the address corresponding to a value in the virtually padded data structure that is not a padding value, the address of the location in the initial data structure.

In some aspects, the techniques described herein relate to a method, further including: obtaining, based on the address corresponding to a padding value in the virtually padded data structure, the padding value by applying a function to the address, and obtaining, based on the address corresponding to a value in the virtually padded data structure that is not a padding value, the address of the location in the initial data structure by applying a function to the received address.

In some aspects, the techniques described herein relate to a method, wherein whether the address corresponds to a value in the virtually padded data structure that is not a padding value is based on a field in a page table entry or other tracking structure that includes the address.

In some aspects, the techniques described herein relate to a method, wherein whether the address corresponds to a value in the virtually padded data structure that is not a padding value is based on whether the address is within a particular range, based on one or more bits in an issuing instruction including the address, or based on an index into a padding data table.

In some aspects, the techniques described herein relate to a system including: an address checking module to receive a virtual address of a location in virtual memory, and a module to output, without having stored all of multiple padding elements of a virtually padded data structure in memory, a padding value based on the address corresponding to a padding value in the virtually padded data structure.

In some aspects, the techniques described herein relate to a system, wherein the module is further to output, based on the address corresponding to a value in the virtually padded data structure that is not a padding value, an address of the location in an initial data structure that is a basis for the virtually padded data structure.

In some aspects, the techniques described herein relate to a system, wherein the module is further to: maintain a record of a location, a shape, and a size of the virtually padded data structure, and a location, a shape, and a size of a initial data structure that is a basis for the virtually padded data structure.

In some aspects, the techniques described herein relate to a system, wherein the module is further to: receive a padding instruction identifying the initial data structure and a type of padding to use for the virtually padded data structure, and maintain, in the record, an indication of the type of padding as associated with the initial data structure.

In some aspects, the techniques described herein relate to a computing device including: a memory management unit, and a virtual padding unit to receive an address of a location in memory and output to the memory management unit, without having stored all of multiple padding elements of a virtually padded data structure in memory, an address of the location in an initial data structure that is a basis for the virtually padded data structure.

In some aspects, the techniques described herein relate to a computing device, wherein the virtual padding unit additionally outputs, a padding value based on the address corresponding to a padding value in the virtually padded data structure.

In some aspects, the techniques described herein relate to a computing device, wherein the virtual padding unit outputs, as the padding value, a constant value.

In some aspects, the techniques described herein relate to a computing device, wherein the virtual padding unit further: receives a padding instruction identifying the initial data structure and a type of padding to use for the virtually padded data structure.

Figure 1:
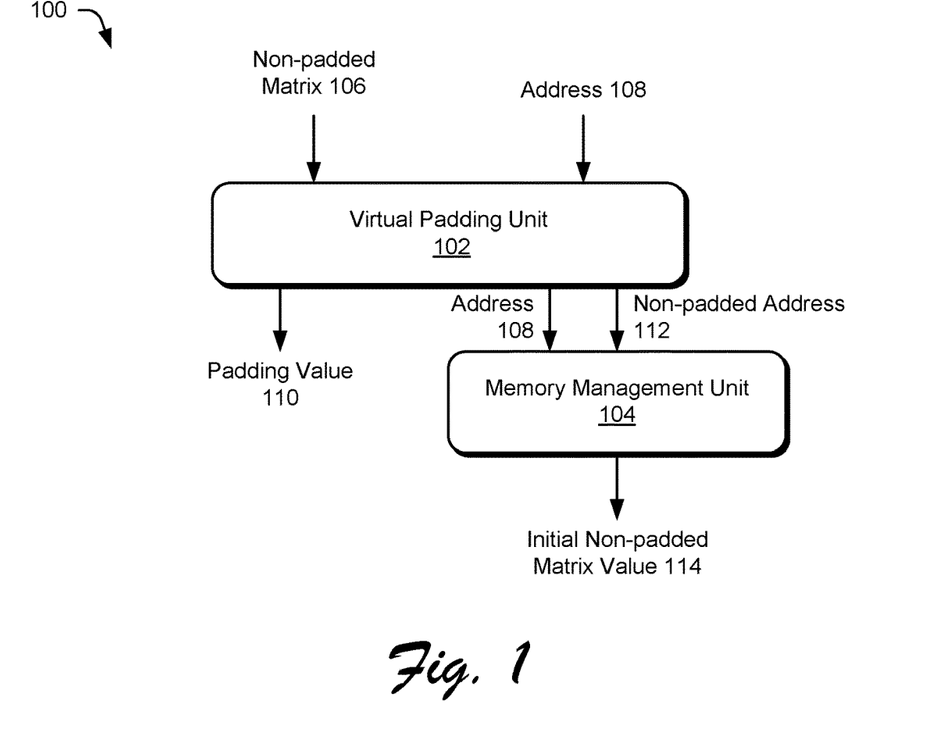
FIG. 1 is an illustration of a non-limiting example system that is operable to employ the virtually padding data structures techniques described herein.

FIG. 1 is an illustration of a non-limiting example system 100 that is operable to employ the virtually padding data structures techniques described herein. The system 100 includes a virtual padding unit 102 and a memory management unit 104. The virtual padding unit 102 receives a non-padded matrix 106 and provides output values as if there were a padded matrix generated from the non-padded matrix 106 but without storing all of the padding elements of the padded matrix in physical memory. Providing the output values as if there were a padded matrix generated from the non-padded matrix 106 is also referred to as having a virtually padded matrix that is based on the non-padded matrix 106. Accordingly, the non-padded matrix 106 is also referred to as being the basis for the virtually padded data structure.

Figure 2:
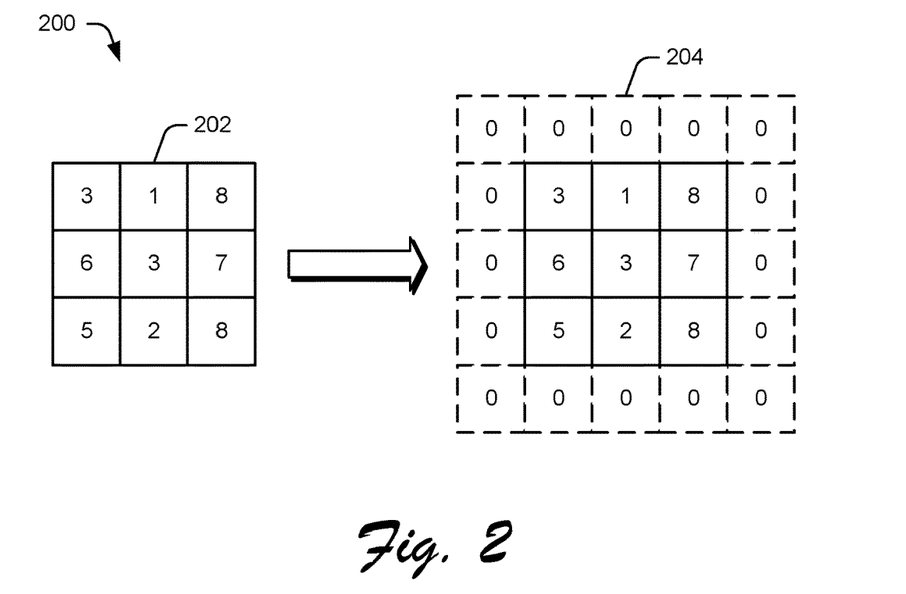
FIG. 2 illustrates an example of a padded matrix.

FIG. 2 illustrates an example 200 of a padded matrix. The example 200 includes an initial non-padded matrix 202, which is a 3×3 matrix. The initial non-padded matrix 202 is padded by adding additional matrix elements surrounding the elements in the initial non-padded matrix 202 with padding values, resulting in a 5×5 matrix. In the illustrated example 200, a padded matrix 204 is generated using padding values that are a constant (the constant 0 in the illustrated example). Additionally or alternatively, the padding values are generated or selected in various other manners as discussed in more detail below.

The padded matrix 204 includes the initial non-padded matrix 202 surrounded by padding values. The elements of the initial non-padded matrix 202 are illustrated with solid lines and the elements including padding values (also referred to as padding elements) are illustrated with dashed lines. The virtual padding unit 102 (in FIG. 1) provides a virtually padded matrix (not shown), so the virtual padding unit 102 (in FIG. 1) provides the output values of the padded matrix 204 generated from the non-padded matrix 202 but without storing all of the padding elements of the padded matrix 204 in physical memory. Rather, the elements of the initial non-padded matrix 202 are stored in physical memory and the virtual padding unit 102 provides the padding elements as discussed in more detail below.

Returning to FIG. 1, to provide the output values for a padded matrix generated from the non-padded matrix 106, the virtual padding unit 102 receives the non-padded matrix 106, such as the location, size, and shape of the non-padded matrix 106. The virtual padding unit 102 receives the non-padded matrix 106 in various manners, such as in response to a padding function called by a program running on the device implementing the virtual padding unit 102. In one or more implementations the virtual padding unit 102 also receives an indication of the shape and type of padding to use for the virtually padded matrix. Additionally or alternatively, the virtual padding unit 102 is preconfigured with the shape and type of padding to use for the virtually padded matrix. For example, in one or more implementations the system 100 includes multiple virtual padding units 102, each corresponding to a particular shape and/or type of padding to use for the virtually padded matrix.

The virtual padding unit 102 maintains a record of the memory address range of the non-padded matrix 106 as well as a record of the memory address range of the padded matrix. The program assumes that the non-padded matrix 106 is padded after calling the padding function and makes subsequent accesses to the padded matrix using the memory address range of the padded matrix.

In one or more implementations, a program is able to assume the virtual memory address range of the padded matrix. For example, the program knows that the virtual padding unit 102 generates a 5×5 padded matrix and thus assumes what the virtual memory address range of 5×5 padded matrix is. Additionally or alternatively, the program is provided with the virtual memory address range of the padded matrix. For example, in response to the padding function being called, the padding function returns the virtual memory address range of the padded matrix.

When the virtual padding unit 102 receives an address 108, the virtual padding unit 102 determines whether the address 108 corresponds to a virtually padded matrix in any of various manners, such as based on the address 108 (e.g., whether the address 108 is within a particular range), based on entries in a page table entry corresponding to the address 108 or similar structure, based on one or more bits in the issuing instruction including the address 108, based on an index (included in the issuing instruction including the address 108) into a padding data table, and so forth. Accordingly, the virtual padding unit maintains a record of a location, a shape, and a size of the virtually padded data structure, and a location, a shape, and a size of the initial data structure, and uses this record to determine whether the address 108 corresponds to a virtually padded matrix.

If the address 108 does not correspond to a virtually padded matrix, then the virtual padding unit 102 passes through the address 108 (e.g., outputs the address 108 to the memory management unit 104). For example, if the address 108 is a virtual address then the address 108 is provided to a page table or a translation lookaside buffer. The memory management unit 104 obtains the value at the address 108 from physical memory, such as system random access memory (RAM), cache memory, and so forth.

If the address 108 corresponds to a virtually padded matrix, the virtual padding unit 102 checks whether the address 108 corresponds to a matrix element that was in the non-padded matrix 106 or a matrix element that is a padding element. As discussed above, the virtual padding unit 102 maintains a record of a location, a shape, and a size of the virtually padded data structure, and a location, a shape, and a size of the initial data structure. The virtual padding unit 102 uses this record to determine whether the address 108 corresponds to a matrix element that was in the non-padded matrix 106 or a matrix element that is a padding element. In response to determining that the address 108 corresponds to a padding element of the virtually padded matrix, the virtual padding unit 102 outputs a padding value 110 corresponding to that padding element. The virtual padding unit 102 outputs the padding value 110 to, for example, a processing unit performing one or more matrix operations (e.g., matrix multiplication) on the virtually padded matrix.

In response to determining that the address 108 corresponds to a matrix element that was in the non-padded matrix 106, the virtual padding unit 102 outputs a non-padded address 112 corresponding to the matrix element, such as the address of the matrix element in the non-padded matrix 106. The non-padded address 112 is provided to the memory management unit 104, which obtains the value of the matrix element at the non-padded address 112 and outputs the value as initial non-padded matrix value 114. For example, if the non-padded address 112 is a virtual address then the non-padded address 112 is provided to a page table or a translation lookaside buffer. The memory management unit 104 obtains the value at the non-padded address 112 from physical memory, such as system RAM, cache memory, and so forth. The memory management unit 104 outputs the value at the non-padded address 112 to, for example, a processing unit performing one or more matrix operations (e.g., matrix multiplication) on the virtually padded matrix.

Some discussions herein refer to a virtually padded matrix. It should be noted, however, that the techniques discussed herein are applicable to any of various different types of data structures, such as matrices, arrays, and so forth. It should also be noted that the techniques discussed herein are not limited to single address translation level (e.g., one virtual address to one physical address), and is useable with multi-level address translations.

Figure 3:
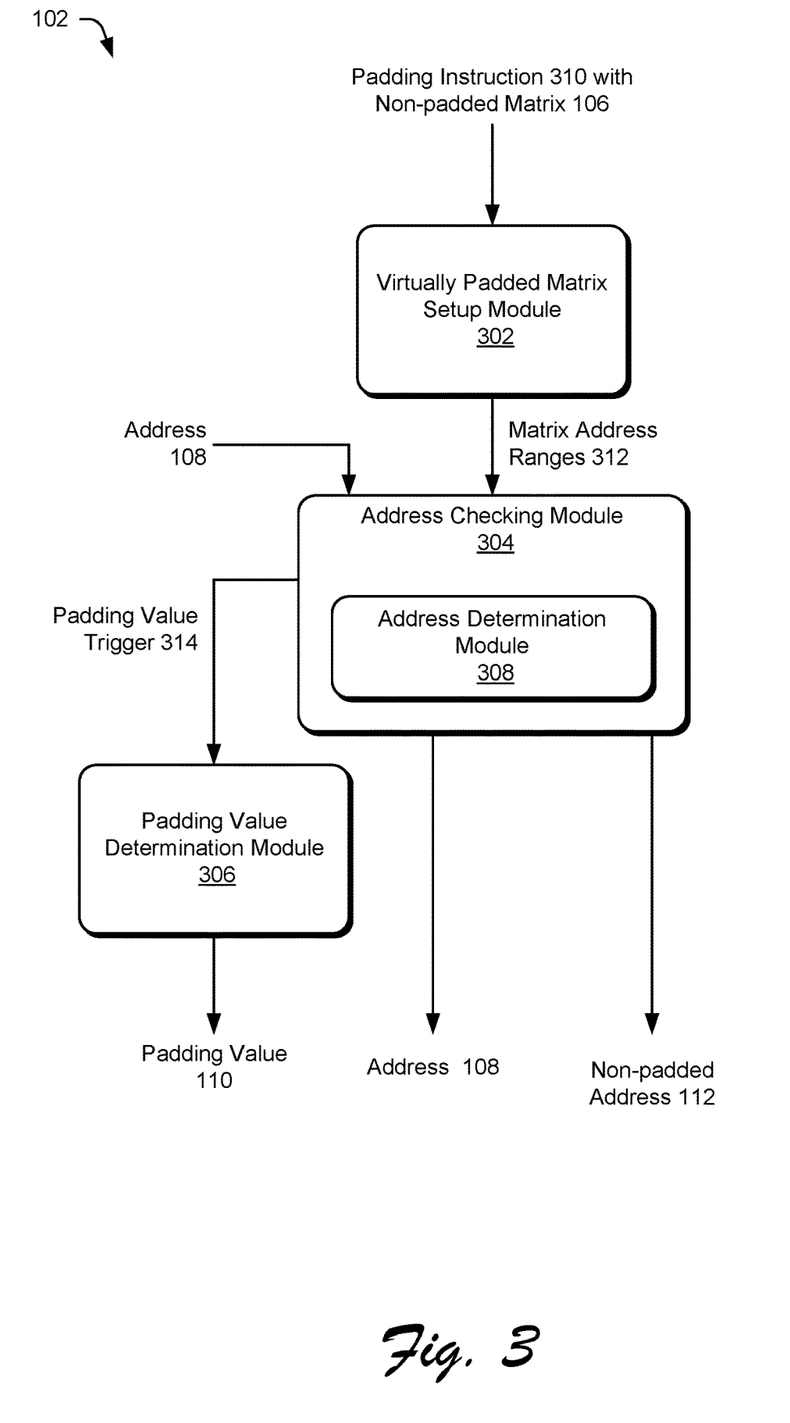
FIG. 3 illustrates an example architecture of a virtual padding unit.

FIG. 3 illustrates an example architecture of a virtual padding unit 102. The virtual padding unit 102 includes a virtually padded matrix setup module 302, a address checking module 304, a padding value determination module 306, and an address determination module 308.

The virtually padded matrix setup module 302 generates or sets up a virtually padded matrix in response to a matrix padding instruction 310 or request accompanied by a non-padded matrix 106. The matrix padding instruction 310 is received, for example, in response to a program calling a padding function as discussed above. In one or more implementations, the virtually padded matrix setup module 302 identifies virtual address ranges for both the virtually padded matrix and the non-padded matrix 106, and provides these address ranges as matrix address ranges 312 to the address checking module 304. The matrix address ranges 312 are, for example, stored in a table accessible to the address checking module 304.

The address range of the non-padded matrix 106 is the virtual memory address range where the data elements for the non-padded matrix 106 are stored. The address range of the virtually padded matrix is readily determined in various manners based at least in part on the size and shape of the virtually padded matrix. The size and shape of the virtually padded matrix (e.g., the dimensions of the virtually padded matrix) is identified in various manners, such as identified as part of the padding instruction 310, being pre-configured in the virtually padded matrix setup module 302 (e.g., the virtually padded matrix setup module 302 is configured to always generate the same size and shape of virtually padded matrix, such as a size and shape tailored to a particular matrix arithmetic unit), and so forth.

The virtually padded matrix setup module 302 is able to receive a padding instruction 310 and non-padded matrix 106 for multiple non-padded matrices. For each such non-padded matrix, the virtually padded matrix setup module 302 identifies virtual address ranges for both the virtually padded matrix and the non-padded matrix 106, and provides address ranges as matrix address ranges 312 to the module 304 and the address determination module 308.

The address checking module 304 receives an address 108 and determines whether the address 108 is an address in a virtually padded matrix. This determination is made in any of a variety of manners as discussed above, such as based on the address 108 (e.g., whether the address 108 is within a particular range), based on entries in a page table entry corresponding to the address 108, based on one or more bits in the issuing instruction including the address 108, and so forth. If the address 108 is not an address in a virtually padded matrix, the address checking module 304 outputs the address 108 to the memory management unit 104.

If the address 108 is an address in a virtually padded matrix, the address checking module 304 checks whether the address 108 corresponds to a matrix element that was in the non-padded matrix 106 or a matrix element that is a padding element. In response to determining that the address 108 corresponds to a padding element of the virtually padded matrix, the address checking module 304 outputs a padding value trigger 314 to the padding value determination module 306 corresponding to that padding element. The padding value trigger 314 indicates to the padding value determination module 306 to output a padding value, and optionally includes an indication of the non-padded address 112 (e.g., in situations where different padding elements have different values).

The padding value determination module 306 determines the padding value 110 in any of a variety of different manners. In one or more implementations, the padding value determination module 306 is configured to determine padding values in a specific manner Additionally or alternatively, the padding value determination module 306 receives an indication (e.g., in padding instruction 310) of how to determine the padding values (e.g., a type of padding to use). The padding value determination module 306 optionally determines padding values in different manners for different virtually padded matrices.

In one or more implementations, padding value determination module 306 determines that the padding values are all the same constant (e.g., all 0). Additionally or alternatively, the padding value determination module 306 uses a type of padding referred to as reflection padding. In reflection padding, the first element of matrix in each dimension is considered as the reflector and the content of other elements in that dimension are reflected reversely into the corresponding padding elements of that dimension. For example, a non-padded matrix row of (1,2,3) will be padded by adding (3,2) and (2,1) to the front and back of the row, respectively, to become a padded matrix row of (3,2,1,2,3,2,1). Additionally or alternatively, the padding value determination module 306 uses a type of padding referred to as replication padding. In replication padding, the content of all matrix elements including the first one in the dimension will be replicated reversely into the padding elements of the dimension. For example, a non-padded matrix row of (1,2,3) will be padded by adding (1,1) and (3,3) to the front and back of the row, respectively, to become a padded matrix row of (1,1,1,2,3,3,3).

In one or more implementations, when the padding value determination module 306 determines the padding values other than by having them all be the same constant (e.g., when using reflection padding or replication padding), a cache is used. For example, instead of going through the address translation to get the corresponding padding value, the virtual padding unit caches (e.g., locally) highly used padding address-value pairs (such as (padding value, address)) or (padding value, address range) tuples). This way, the padding value determination module 306 utilizes the cached values and outputs the padding value directly. Similar caching techniques are also useable with an image to column (im2col) technique discussed in more detail below.

Additionally or alternatively, the padding value determination module 306 uses address based arithmetic to derive padding values. For example, the padding value is a function of the address.

In response to determining that the address 108 corresponds to a matrix element that was in the non-padded matrix 106, the address determination module 308 determines and outputs, to the memory management unit 104, the non-padded virtual address 112 that corresponds to the address 108.

The address determination module 308 determines the non-padded virtual address 112 based on the address 108 in any of a variety of different manners. In one or more implementations, the matrix address ranges 312 are stored in a table accessible to the address determination module 308. This table includes, for example, a virtual base address (e.g., virtual starting address) and a virtual ending address for the virtually padded matrix, and a base address (e.g., starting address) for the non-padded matrix 106.

Figure 4:
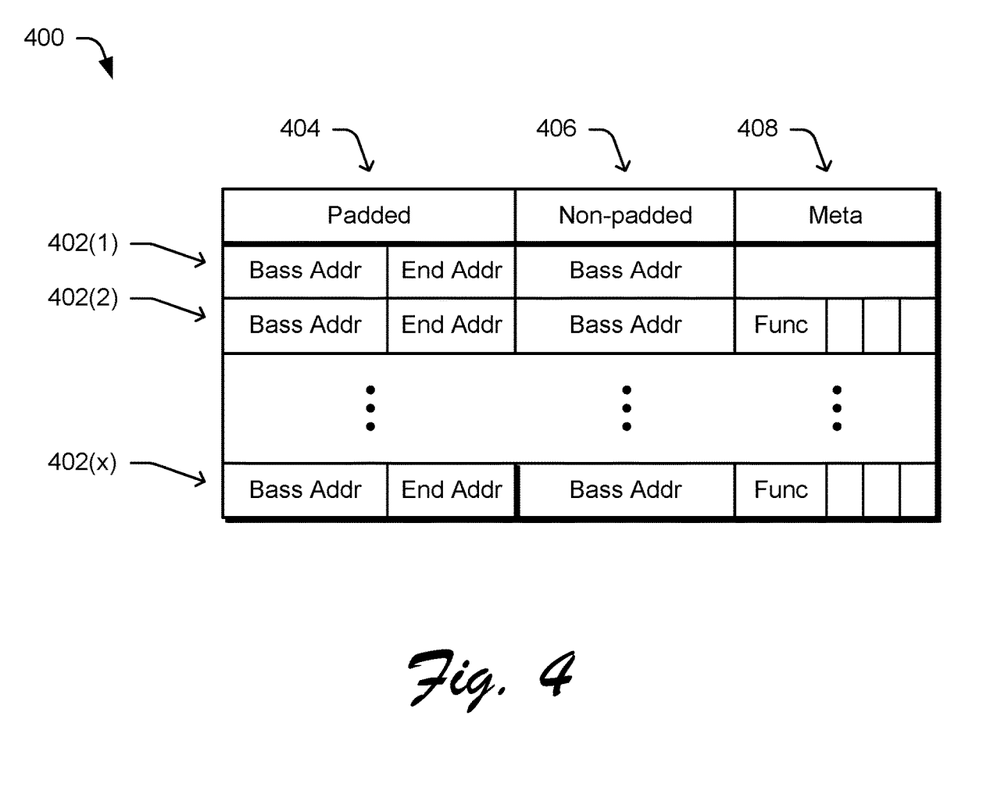
FIG. 4 illustrates an example table used by the virtual padding unit.

FIG. 4 illustrates an example table 400 used by the virtual padding unit. The table 400 includes multiple rows 402(1), 402(2), . . . , 402(x), one for each virtually padded matrix. As illustrated, the table 400 includes a column corresponding to the virtually padded matrix 404, a column corresponding to the non-padded matrix 406, and a column corresponding to metadata 408. The column corresponding to the virtually padded matrix 404 includes a base address and an ending address for the virtually padded matrix. The column corresponding to the non-padded matrix 406 includes a base address for the non-padded matrix 106. The column corresponding to metadata 408 includes various metadata corresponding to the virtually padded matrix identified in that row. Any of various metadata is included in the metadata 408, such as a function (or identifier of a function) to use to determine the non-padded address 112 from the address 108, a constant to use for the padding elements, a type of padding to use (e.g., reflection padding, replication padding, constant value padding (e.g., all 0)), the dimensions of the virtually padded matrix, the dimensions of the non-padded matrix, the size of the virtually padded matrix, the size of the non-padded matrix, and so forth.

In one or more implementations, where the address 108 is a virtual address, entries in the table 400 are indexed based on coarse-grain (e.g., page-based) padded virtual addresses to produce the non-padded ones. Then, the non-padded addresses corresponding to the padded virtual address is provided to the memory management unit 104 to be converted to a physical address. For large (e.g., multi-page mappings), such indexing results in multiple entries in the table 400, each having a base address and ending address for a portion of the virtually padded matrix. Additionally or alternatively, a lookup triggers a range check against each entry in the table 400 to determine whether the padded virtual address falls within the padded address range.

Returning to FIG. 3, the address determination module 308 uses these base addresses in the table to determine the non-padded address 112 from the address 108. Various functions are usable to determine the non-padded address 112 from the address 108. For example, various functions based on one or more of a number of rows in the non-padded matrix, a number of columns in the non-padded matrix, a size of (e.g., number of) padding elements on the top of the non-padded matrix, a size of (e.g., number of) padding elements on the bottom of the non-padded matrix, a size of (e.g., number of) padding elements on the left of the non-padded matrix, a size of (e.g., number of) padding elements on the right of the non-padded matrix, and so forth are used to determine the non-padded address 112 from the address 108.

The function to use to determine the non-padded address 112 from the address 108 is specified in any of a variety of different manners. In one or more implementations, the function is inherent (e.g., preconfigured) in the virtual padding unit 102. Additionally or alternatively, the function is specified in other manners, such as indicated in the padding instruction 310 and maintained as metadata in the table 400.

The address checking module 304 determines whether the address 108 corresponds to a matrix element that was in the non-padded matrix 106 or a matrix element that is a padding element in any of a variety of different manners. In one or more implementations, the address checking module 304 compares the NPVA generated by the address determination module 308 to the address range for the non-padded matrix 106 to determine whether the address 108 is in the address range for the non-padded matrix 106 (and thus corresponds to a matrix element that was in the non-padded matrix 106) or not in the address range for the non-padded matrix 106 (and thus corresponds to a padding element).

Figure 5:
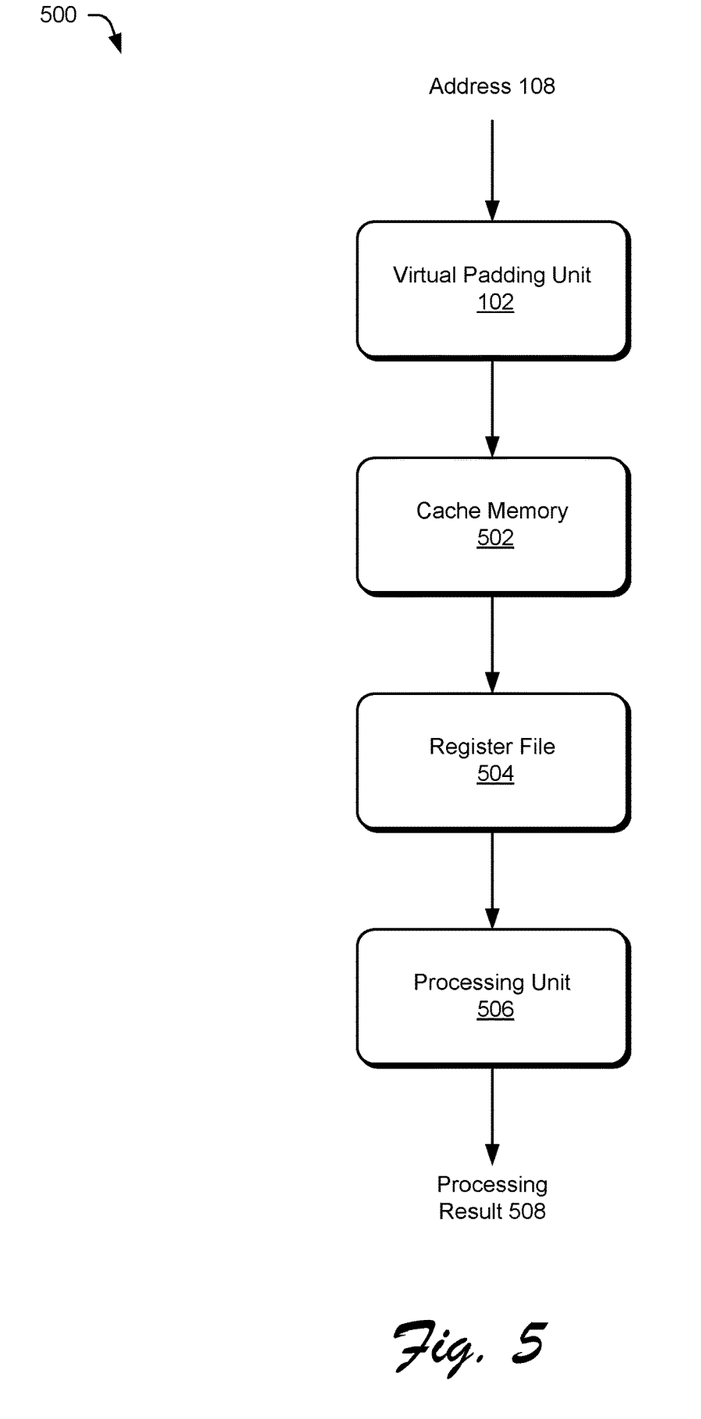
FIGS. 5, 6, and 7 illustrate example systems that include a cache memory, a register file, a processing unit, and a virtual padding unit.
Figure 6:
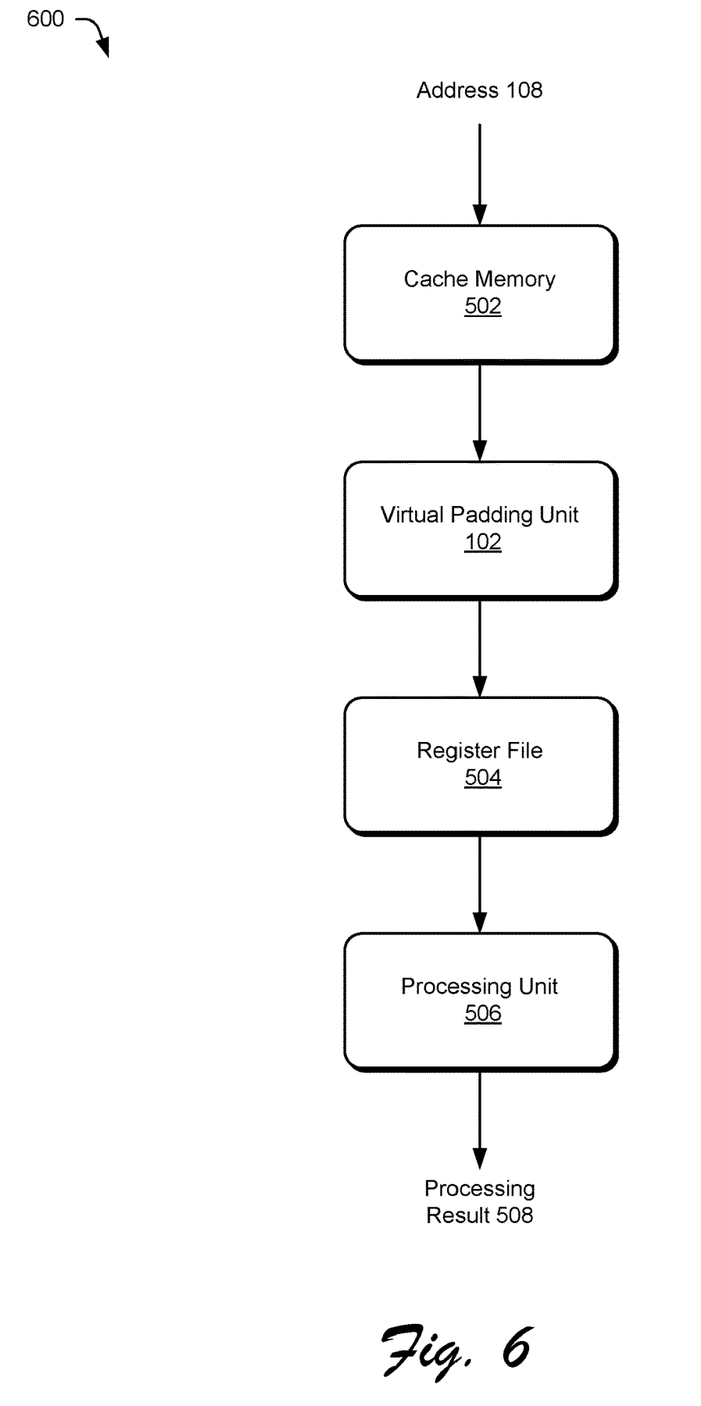
Figure 7:
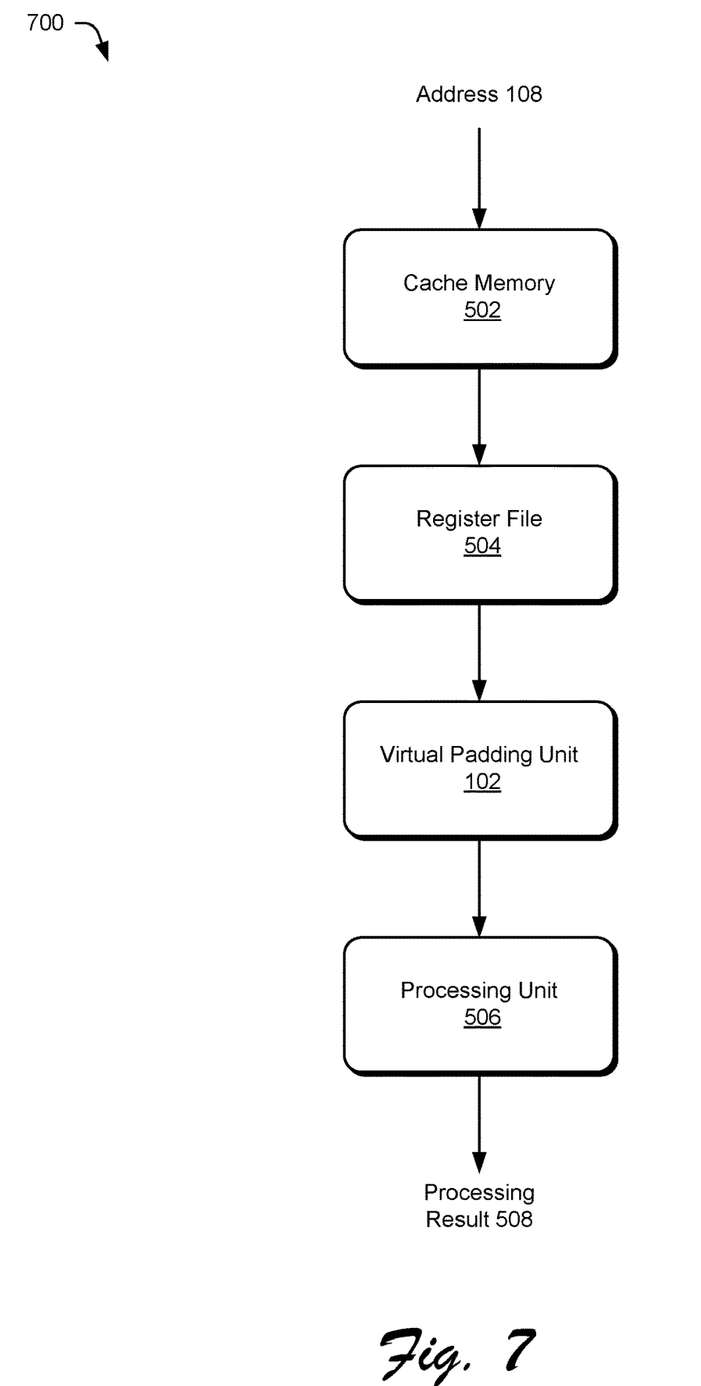

FIGS. 5, 6, and 7 illustrate example systems including a virtual padding unit at different locations. FIG. 5 illustrates an example system 500 that includes a cache memory 502, a register file 504, and a processing unit 506. The cache memory 502 stores data retrieved from system memory (e.g., RAM) and provides the data to the register file 504. The register file 504 stores values used by registers of the processing unit 506. The processing unit 506 performs various operations based on the data in the register file 504, such as matrix multiplication to perform convolution, and outputs a processing result 508.

In the example system 500, the virtual padding unit 102 is located prior to the cache memory 502. Accordingly, the system memory need only store the non-padded matrix 106, and the virtual padding unit 102 outputs data for the padded matrix, which is stored in the cache memory 502. In this example, the padding elements are output by the virtual padding unit 102 and thus need not be stored in system memory, but the padding elements are stored in the cache memory 502 and register file 504.

FIG. 6 illustrates an example system 600 that includes the cache memory 502, the register file 504, and the processing unit 506, which operate as discussed above. The system 600 is similar to the system 500 of FIG. 5, except that in the system 600 the virtual padding unit 102 is located between the cache memory 502 and the register file 504.

In the example system 600, the virtual padding unit 102 is located between the cache memory 502 and the register file 504. Accordingly, the system memory and the cache memory 502 need only store the non-padded matrix 106, and the virtual padding unit 102 outputs data for the padded matrix, which is stored in the register file 504. In this example, the padding elements are output by the virtual padding unit 102 and thus need not be stored in system memory or the cache memory 502, but the padding elements are stored in the register file 504.

FIG. 7 illustrates an example system 700 that includes the cache memory 502, the register file 504, and the processing unit 506, which operate as discussed above. The system 700 is similar to the system 500 of FIG. 5, except that in the system 700 the virtual padding unit 102 is located between the register file 504 and the processing unit 506.

In the example system 700, the virtual padding unit 102 is located between the register file 504 and the processing unit 506. Accordingly, the system memory, the cache memory 502, and the register file 504 need only store the non-padded matrix 106, and the virtual padding unit 102 outputs data for the padded matrix, which is used by the processing unit 506. In this example, the padding elements are output by the virtual padding unit 102 and thus need not be stored in system memory, the cache memory 502, or the register file 504, but the padding elements are made available for the processing unit 506.

Returning to FIG. 3, discussions are included above of maintaining address ranges in a table, for example, a base address (e.g., starting address) and an ending address for the virtually padded matrix, and a base address (e.g., starting address) for the non-padded matrix 106. Additional information is also optionally maintained in the table, such as metadata. In one or more implementations, this table is an independent table implemented in the virtual padding unit 102.

Additionally or alternatively, this table is incorporated into the memory management unit 104. For example, due to the resemblance between the table used by the virtual padding unit table and page tables in the memory management unit 104, these two tables are combinable. This combination is made in various manners, such as by adding an extra field to page table entries (PTEs) to keep track of linkage between non-padded and padded address ranges. Additional information, such as metadata as discussed above is optionally include in another extra field in the page table entries.

Furthermore, the table is discussed above as including entries for multiple padded matrices. In some situations the table becomes full, in which case the virtual padding unit 102 implements a replacement or eviction policy to identify one or more entries to remove from the table (e.g., delete from the table or overwrite). Any of a variety of replacement or eviction policies are usable, such as removing entries corresponding to a least recently used virtually padded matrix, removing entries corresponding to a least frequently used virtually padded matrix, and so forth. In one or more implementations, no replacement or eviction policy is utilized and the baseline approach of allocating the padded matrix in memory is used.

In one or more implementations, the virtual padding unit 102 is implemented without any changes to the instruction set architecture used by the computer implementing the virtual padding unit 102. Additionally or alternatively, the instruction set architecture is modified to include an extra (e.g., one-bit) field for matrix instructions, the extra field indicating whether the corresponding matrix is non-padded or padded. This extra field allows the virtual padding unit 102 to perform address translation and address checking only for matrix instructions, in which the operand is non-padded or padded. In such implementations, the overhead of the address translation process and address checking is not imposed on other matrix-related instructions.

In one or more implementations, the techniques discussed herein are used to reshape or resize the non-padded matrix 106. For example, in some situations an image to column (im2col) technique is used to flatten out portions (e.g., windows) of a matrix into columns, resulting in a larger matrix. The techniques discussed herein are usable to perform such reshaping or resizing of the non-padded matrix 106 by maintaining a translation function that maps elements of the non-padded matrix 106 to the reshaped or resized matrix. This reshaped or resized matrix optionally includes some padding elements. The translation function is obtained in any of variety of different manners, such as being pre-configured in the virtual padding unit 102. Additionally or alternatively, the translation function is received with a reshaping or resizing instruction (analogous to the padding instruction 310) from a program calling a reshaping or resizing instruction. The translation function is optionally maintained in metadata associated with the non-padded matrix 106, such as in table 400 discussed above.

In one or more implementations, the virtual padding unit 102 reshapes or resizes matrices automatically. For example, assume that a processing unit is designed to perform matrix operations on matrices of a particular dimension with a particular type of padding. The virtual padding unit 102 automatically pads received matrices to that particular dimension. Accordingly, the program need not provide any indication of the dimension of the padded matrix or the type of padding to be used. Further, the programmer need have no knowledge that this padding is being performed.

In one or more implementations, the virtual padding unit 102 is implemented in a computer that uses a single instruction multiple data (SIMD) architecture. In SIMD systems, multi-lane SIMD memory requests often target multiple addresses, which are commonly contiguous or separated by a constant value. In such systems, the virtual padding unit 102 optionally takes advantage of this contiguous nature to avoid performing the remapping for each SIMD lane individually. The virtual padding unit 102 determines the offset for the first address and checks that all subsequent addresses fall into the same padded range. The virtual padding unit 102 translates the first address using the techniques discussed above (e.g., determines the non-padded virtual address (referred to as NPVA) discussed above), and computes the offsets of subsequent addresses based on the first address (e.g., incrementing by the appropriate offset amount for each subsequent address). It should be noted that situations arise in which some of the addresses fall in the padding region (e.g., detected by a simple range check on the first address), in which case the appropriate padding values are shifted in.

In one or more implementations, the virtual padding unit 102 is implemented in a computer that uses a coalescer, which determines whether each SIMD lane accesses the same line and coalesces accesses into a single request. In one or more implementations, the virtual padding unit 102 is placed before the coalescing unit, first the non-padded virtual addresses are generated by the virtual padding unit 102 and then will be coalesced by the coalescing unit if coalescable. In one or more implementations, the virtual padding unit performs its task independently on each SIMD lane. Additionally or alternatively, the virtual padding unit 102 has to ensure the input addresses are contiguous (e.g., via a check that raises an error or a requirement on the programming model), which allows the virtual padding unit 102 to amortize much of the translation costs over multiple threads.

Additionally or alternatively, the virtual padding unit 102 is located after the coalescing unit. In this configuration, addresses are guaranteed to be contiguous (the virtual padding unit 102 translates every element in a cache line), avoiding the need for contiguity, but there is a possibility that the remapped addresses of a coalesced request will access portions of multiple cache blocks, or will access both padding and non-padding data. Thus, if the virtual padding unit 102 is located after the coalescer unit, there is a secondary coalescer unit to group non-padding requests to the same cache block (this will be less complex than the first coalescer due to the contiguous nature of output addresses).

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. Furthermore, although various operations performed by one or more devices are recited, the techniques discussed herein additionally or alternatively include additional operations. In portions of the following discussion, reference is made to FIGS. 1-7.

Figure 8:
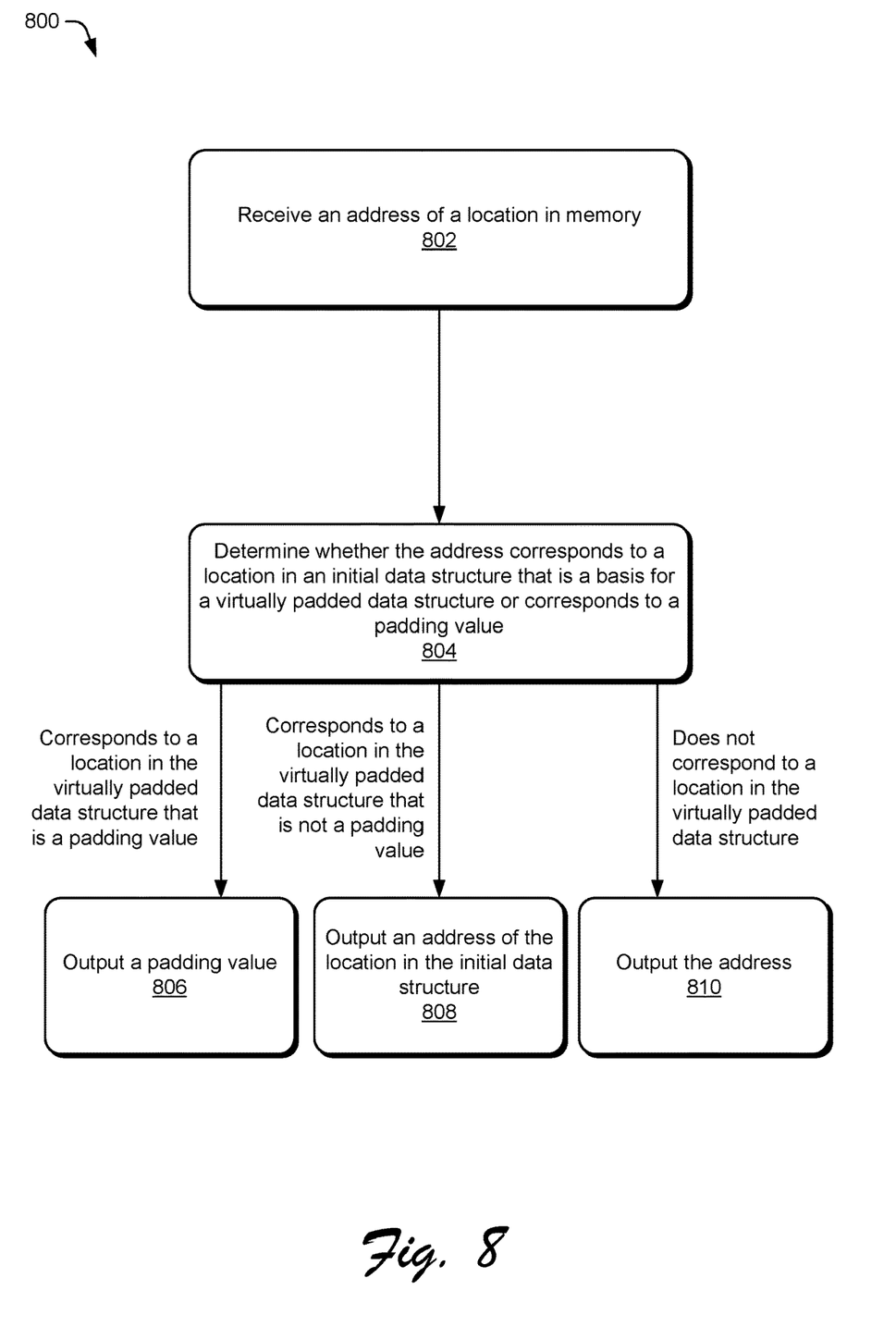
FIG. 8 is a flow diagram depicting a procedure in an example implementation of virtually padding data structures.

FIG. 8 is a flow diagram 800 depicting a procedure in an example implementation of virtually padding data structures. The flow diagram 800 is performed, for example, by a virtual padding unit 102 of FIG. 1, 3, 5, 6, or 7.

In this example, a virtual address of a location in virtual memory is received (block 802).

A determination is made as to whether the virtual address corresponds to a location in an initial data structure that is a basis for a virtually padded data structure or corresponds to a padding value (block 804). In one or more implementations, the initial data structure is a non-padded data structure, such as a matrix (e.g., non-padded matrix 202 of FIG. 2), and the virtually padded data structure is, for example, a virtually padded matrix.

If the virtual address corresponds to a location in the virtually padded data structure that is a padding value, a padding value is output (block 806). This padding value is, for example, a constant value or other type of padding value (e.g., generated using replicated padding or reflection padding).

If the virtual address corresponds to a location in the virtually padded data structure that is not a padding value, an address of the location in the initial data structure is output (block 808).

If the virtual address does not correspond to a location in the virtually padded data structure, the address is output (block 810). For example, the address is passed through the virtual padding unit.

The various functional units illustrated in the figures and/or described herein (including, where appropriate, the virtual padding unit 102, the memory management unit 104, the address checking module 304, the padding value determination module 306, and the address determination module 308) are implemented in any of a variety of different manners such as hardware circuitry, software executing or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, aspects of the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving an address of a location in memory; and
   outputting, based on the address corresponding to a padding value in a virtually padded data structure having multiple padding values and without having stored all of the multiple padding values of the virtually padded data structure in memory, the padding value.

2. The method of claim 1, wherein the virtually padded data structure comprises a virtually padded matrix.

3. The method of claim 1, further comprising outputting, based on the address corresponding to a value in the virtually padded data structure that is not a padding value, an address of the location in an initial data structure that is a basis for the virtually padded data structure.

4. The method of claim 1, further comprising, based on the address not corresponding to a location in the virtually padded data structure, passing through the address.

5. The method of claim 1, further comprising:
   maintaining a record of a location, a shape, and a size of the virtually padded data structure, and a location, a shape, and a size of an initial data structure that is a basis for the virtually padded data structure.

6. The method of claim 5, further comprising:
   receiving a padding instruction identifying the initial data structure and a type of padding to use for the virtually padded data structure; and
   maintaining, in the record, an indication of the type of padding as associated with the initial data structure.

7. The method of claim 1, wherein the outputting comprises outputting, as the padding value, a constant value.

8. The method of claim 1, further comprising:
   receiving a padding instruction identifying an initial data structure that is a basis for the virtually padded data structure and a type of padding to use for the virtually padded data structure.

9. The method of claim 3, further comprising:
   retrieving from a cache, based on the address corresponding to a padding value in the virtually padded data structure, the padding value; and
   retrieving from the cache, based on the address corresponding to a value in the virtually padded data structure that is not a padding value, the address of the location in the initial data structure.

10. The method of claim 3, further comprising:
    obtaining, based on the address corresponding to a padding value in the virtually padded data structure, the padding value by applying a function to the address; and
    obtaining, based on the address corresponding to a value in the virtually padded data structure that is not a padding value, the address of the location in the initial data structure by applying a function to the received address.

11. The method of claim 1, wherein whether the address corresponds to a value in the virtually padded data structure that is not a padding value is based on a field in a page table entry or other tracking structure that includes the address.

12. The method of claim 1, wherein whether the address corresponds to a value in the virtually padded data structure that is not a padding value is based on whether the address is within a particular range, based on one or more bits in an issuing instruction including the address, or based on an index into a padding data table.

13. A system comprising:
    a memory; and
    at least one processor configured to:
       receive a virtual address of a location in virtual memory; and
       output, without having stored all of multiple padding values of a virtually padded data structure in the memory, a padding value based on the address corresponding to a padding value in the virtually padded data structure.

14. The system of claim 13, wherein the at least one processor is further configured to output, based on the address corresponding to a value in the virtually padded data structure that is not a padding value, an address of the location in an initial data structure that is a basis for the virtually padded data structure.

15. The system of claim 13, wherein the at least one processor is further configured to:
    maintain a record of a location, a shape, and a size of the virtually padded data structure, and a location, a shape, and a size of an initial data structure that is a basis for the virtually padded data structure.

16. The system of claim 15, wherein the at least one processor is further configured to:
    receive a padding instruction identifying the initial data structure and a type of padding to use for the virtually padded data structure; and
    maintain, in the record, an indication of the type of padding as associated with the initial data structure.

17. A computing device comprising:
    a memory; and
    at least one processor configured to receive an address of a location in the memory and output, without having stored all of multiple padding values elements of a virtually padded data structure in the memory, an address of the location in an initial data structure that is a basis for the virtually padded data structure.

18. The computing device of claim 17, wherein the at least one processor is further configured to output a padding value based on the address corresponding to a padding value in the virtually padded data structure.

19. The computing device of claim 18, wherein the at least one processor is further configured to output, as the padding value, a constant value.

20. The computing device of claim 18, wherein the at least one processor is further configured to:
    receive a padding instruction identifying the initial data structure and a type of padding to use for the virtually padded data structure.

* * * * *